United States Patent
Hornaday (10) Patent No.: US 8,287,210 B2
(45) Date of Patent: Oct. 16, 2012

(54) SUB-AQUEOUS PLACEMENT OF WATER-BASED SUSPENSIONS AND METHOD OF MANUFACTURE AND USE

(75) Inventor: Charles J. Hornaday, Arlington Heights, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 34 days.

(21) Appl. No.: 12/948,384

(22) Filed: Nov. 17, 2010

(65) Prior Publication Data
US 2012/0121334 A1   May 17, 2012

(51) Int. Cl.
*B09C 1/08* (2006.01)

(52) U.S. Cl. ........... 405/128.45; 405/128.15; 405/128.7; 405/128.75

(58) Field of Classification Search ........... 405/15, 405/16, 17, 129.2, 129.25, 128.15, 128.45, 405/128.7, 128.75, 263, 268, 270
See application file for complete search history.

(56) References Cited

U.S. PATENT DOCUMENTS

| | | | |
|---|---|---|---|
| 3,301,848 A | 1/1967 | Halleck | |
| 4,299,825 A | 11/1981 | Lee | |
| 4,342,866 A | 8/1982 | Kang et al. | |
| 4,503,084 A | 3/1985 | Baird et al. | |
| 4,670,550 A | 6/1987 | Bleeker et al. | |
| 4,758,356 A | 7/1988 | Downs | |
| 4,894,335 A | 1/1990 | Peignier et al. | |
| 5,316,847 A | 5/1994 | Suominen | |
| 5,538,787 A * | 7/1996 | Nachtman et al. | 405/17 |
| 5,775,836 A * | 7/1998 | Dean, Jr. | 405/17 |
| 5,897,946 A * | 4/1999 | Nachtman et al. | 405/17 |
| 5,977,030 A | 11/1999 | House | |
| 6,386,796 B1 * | 5/2002 | Hull | 405/128.25 |
| 6,398,960 B1 * | 6/2002 | Borden et al. | 405/128.45 |
| 6,558,081 B2 * | 5/2003 | Hull | 405/17 |
| 6,620,611 B2 * | 9/2003 | Hince | 435/262.5 |
| 7,011,749 B2 * | 3/2006 | Hayes et al. | 210/170.04 |
| 7,115,203 B2 * | 10/2006 | Hayes et al. | 405/129.25 |
| 7,128,498 B2 * | 10/2006 | Sheahan et al. | 405/129.25 |
| 7,556,739 B1 | 7/2009 | Johnston-Dhuet et al. | |
| 7,670,082 B2 | 3/2010 | Olsta et al. | |

(Continued)

FOREIGN PATENT DOCUMENTS

EP    0 040 445    11/1981

(Continued)

OTHER PUBLICATIONS

"Puregold Cleandrill—Biodegradable Drilling Fluid Used in Horizontal Remediation Well," *Cetco Drilling Products*, 2 pages (1997).
"Puregold Cleandrill—Biodegradable Drilling Fluid," 1 page (2009).

*Primary Examiner* — Frederick L Lagman
(74) *Attorney, Agent, or Firm* — Marshall, Gerstein & Borun LLP (57) ABSTRACT

A suspension having a specific gravity greater than 1.0 that contains one or more reactive materials, said suspension containing a biopolymer that decomposes over time, thereby releasing the contaminant reactant for contact with the contaminants in the waterway bottom sediment or waterway floor material. In one embodiment, the suspension includes a water-buoyant material, that can be placed underwater over a sub-aqueous waterway bottom or floor that contains a contaminant to be treated or confined and remains in place for treatment and/or confinement. After the suspension is placed, it may be stabilized against movement by applying a confining or weighting layer, such as sand or a water-permeable or water-impermeable geotextile, thereover.

17 Claims, 6 Drawing Sheets

U.S. PATENT DOCUMENTS

| | | |
|---|---|---|
| 2006/0160706 A1 | 7/2006 | Deville |
| 2008/0194433 A1 | 8/2008 | Tehrani |
| 2010/0222481 A1* | 9/2010 | Jersak et al. .................. 524/413 |
| 2010/0232883 A1* | 9/2010 | Hoag et al. ............... 405/128.75 |

FOREIGN PATENT DOCUMENTS

| | | |
|---|---|---|
| EP | 0 138 255 | 4/1985 |
| EP | 0 522 624 | 1/1993 |
| EP | 0 680 700 | 11/1995 |

* cited by examiner

SUB-AQUEOUS PLACEMENT OF WATER-BASED SUSPENSIONS AND METHOD OF MANUFACTURE AND USE

FIELD OF THE INVENTION

The present invention is directed to a reactive suspension of a contaminant-sorbent or reactant material for controlling or preventing the further spread of contaminants in water or and acts to confine or cap the underwater sediments. More particularly, in one embodiment, the suspension described herein includes a buoyant sorbent or reactive material, such as activated carbon, suspended together with a weighting material to raise the specific gravity of the suspension to a level of more than 1.0 so that the buoyant material will remain submerged in water.

BACKGROUND AND PRIOR ART

The prior art is replete with methods and articles used to confine or store a wide variety of environmental contaminants ranging from completely capping, in-situ, contaminated sediments that are left in-place in underwater environments; terrestrial landfills wherein dredged or otherwise collected contaminated sediments are placed within an engineered disposal site surrounded with an impervious liner system and capped with an impervious material; and the use of a reactive mat and/or reactive backfill that surrounds the contaminated material.

There is difficulty in deploying sorbent or reactive materials if the materials must be deployed underwater, over a contaminant-containing waterway bottom contamination site, where the active contaminant sorbent or reactive material is water buoyant (has a specific gravity less than that of the water, e.g., <1.0).

SUMMARY

In brief, described herein is a suspension or unstable emulsion having a specific gravity greater than 1.0 that contains one or more sorbent or reactive materials, said suspension containing a biopolymer that decomposes over time to break the suspension or emulsion, thereby releasing the contaminant sorbent or reactant for contact with the contaminant(s) in the waterway bottom sediment or waterway floor material. In one embodiment, the suspension includes a water-buoyant material, that can be placed underwater over a sub-aqueous waterway bottom or floor that contains a contaminant to be treated or confined, and remains in place for treatment and/or confinement. After the suspension is placed, it may be stabilized against movement by applying a confining or weighting layer, such as sand or a water-permeable or water-impermeable geotextile, thereover. The suspension can be placed over (on top of) the upper surface of the contaminated soil or sediment, and/or can be injected into the contaminated soil or sediment to react with contaminants below the soil or sediment surface.

In one embodiment the buoyant material-containing suspension acts to control contaminants in soil, sediment, and/or water that allow the passage of essentially non-contaminated water therethrough. The slurry or suspension includes a powdered or granular contaminant-reactive material, contaminant-sorptive material, or a contaminant-neutralizing material (hereinafter collectively referred to as "contaminant-reactant material" or "contaminant-reactive material"). The powdered or granular contaminant-reactive material is suspended together with a biodegradable polymer and, optionally, a weighting material, such as sand to increase the specific gravity of the suspension to a level greater than 1.0. The biopolymer preferably maintains the suspension intact for at least 24 hours when submerged in water. A liquid-permeable or liquid-impermeable cover sheet, or sand or other weighting material, then may be applied over the suspension, after suspension placement to prevent the powdered or granular material from escaping from its original placement location over time after biodegradation of the biopolymer and consequent breaking of the suspension. A water-permeable cover sheet and/or sand or other weighting material may be placed over the suspension, over an area larger than the dimensions of the suspension placement to completely hold the suspension in place after biodegradation of the biopolymer causes precipitation of the contaminant-reactive material from the suspension, and to allow clean water to pass through the cover sheet and/or weighting material. Each covering material may be either liquid-impermeable or liquid-permeable.

Suitable powdered or granular contaminant-reactive materials include organophilic clay, carbon, coke breeze, zero-valent iron, apatite, zeolite, peat moss, polymeric ion exchange resins, polymeric adsorbents, slag, microbes and food for microbes, and mixtures thereof. If the contaminant-reactive material is lighter than water, where the reactive mat is intended for sub-aqueous deployment, such as coke breeze or activated carbon, the emulsion should contain a weighting material, such as sand.

The method of manufacture permits the manufacture of a suspension or unstable emulsion that does not break for at least 24 hours when submerged in water, and includes a contaminant-reactant material that is structurally secure, without lateral movement, and contains contaminant-reactant material uniformly disposed throughout the suspension. The suspension includes a contaminant-reactant material, such as activated carbon, a zeolite or an organophilic clay for treatment of contaminants in soils, sediments and/or aquifers, under water; a minimum of leakage of powdered or granular materials initially held by the suspension; the optional application of water-permeable or water-impermeable layer(s) of sand or sheets of material over the suspension to confine the granular or powdered contaminant-reactive material in place over time; and, particularly, the capability of deploying the suspension by pumping it into place onto and/or into soils and sediments without the burden of deploying a heavy article that is difficult to deploy and place under water, to achieve the benefits of each.

Accordingly, one aspect of the suspensions and methods described herein is to provide a new and improved contaminant-reactive composition that can be deployed under water, remains underwater and includes a powdered or granular contaminant-reactant material in the suspension that can be pumped or poured in place, over a contaminated waterway bottom soil or sediment material, for treatment and/or confinement of the contaminant(s).

Another embodiment described herein is to provide a new and improved method of disposing, under water, a powdered or granular contaminant-reactant or contaminant-interacting material, wherein the material is selected from the group consisting of an organophilic clay, a zeolite, a contaminant-absorbent, a contaminant-adsorbent, an ion-exchange material, a contaminant-reactant, a contaminant-neutralizing material, and mixtures thereof as separately applied or intermixed materials. The powdered or granular materials may be applied as an admixture, or applied sequentially onto, and/or injected into, a waterway bottom or floor as one or more suspensions that include a biopolymer that bio-decomposes over time to release the powdered or granular material, via suspension breaking, for contact with a contaminant contained in the waterway bottom or floor material.

In another embodiment, the suspension may be deployed onto, and/or injected into a contaminated soil or sediment or waste water lagoon that includes contaminants located below, in or above a water level.

Preferably, the powdered and/or granular material will be included in the suspension in an amount of about 0.5% to about 30% by weight, preferably about 1% to about 10% by weight; with the biopolymer, e.g., guar gum, included in the suspension, in an amount of about 0.5% to about 30% by weight, preferably about 1% to about 10% by weight, with the remainder of the composition being water (40% to about 99% by weight), and optionally a weighting material, such as sand, in an amount sufficient to raise the specific gravity of the suspension to a value greater than 1.0, e.g., about 1% to about 10% by weight of the suspension, to aid in submerging the suspension when it contains a buoyant material. If the weighting material is included, the water content of the suspension is about 30% to about 98% by weight, based on the total weight of the suspension, with the weight percentages of other components as indicated above.

The above and other aspects and advantages of the compositions and deployment methods will become apparent from the following detailed description of the preferred embodiments taken in conjunction with the drawing.

DETAILED DESCRIPTION OF THE PREFERRED EMBODIMENTS

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Some of the most prevalent contaminants found in waste waters contained in ponds, lagoons, areas of subterranean structure and other water-releasing or organic (hydrocarbon) spill areas, particularly where these areas include industrial waste waters, are heavy metal ions and water-insoluble or partially water-insoluble organic materials. It is well known in the prior art that natural and synthetic zeolites and ion exchange resins are capable of removing a substantial portion of the heavy metal ions from a waste water solution and that organophilic clays are capable of removing water-insoluble organic materials from solution. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. The suspensions described herein, containing one or more contaminant-reactive materials, after emulsion breaking, allow the clean water to pass through the reactive material layer while the contaminants are trapped in or on the reactive material.

In accordance with another important embodiment described herein, the contaminant-reactant material, comprising any contaminant-adsorbent, contaminant-absorbent, contaminant-reactant, contaminant-interacting, or contaminant-neutralizing material, can be supplied together with another powdered or granular contaminant-reactant material so that the removal or confinement of multiple contaminants may be achieved by deploying a single, or multiple suspensions, each containing one or more or powdered or granular contaminant-reactant materials.

In accordance with another important feature of the contaminant-reactive compositions and methods described herein, the contaminant-reactant materials can be any material capable of adsorbing, absorbing, neutralizing, reacting or otherwise interacting with the contaminant for insolubilization and/or separation and/or confinement of the contaminant from the water stream flowing through, or otherwise contacting the reactive material. Examples of other materials capable of removing or neutralizing contaminants include absorbent fibers, such as microcrystalline cellulose; attapulgite clay; zinc ricinoleate absorbed on an absorbent fiber or other absorbent material; amorphous silica powder; zero-valent iron; synthetic calcium silicate; polyolefin pulp; sodium aluminosilicate (type A sodium zeolite); maltodextrin; sodium silica aluminates (note that all the above are absorbents). Other materials, such as adsorbents include microcrystalline cellulose; silica hydrogel-based compositions; attapulgites; synthetic sodium magnesium silicates; synthetic calcium silicates; silicon dioxide; acid activated clays; type A sodium zeolites; and the like provided as a separate suspension or mixed with the absorbents and/or adsorbents. Other materials can be included such as an algicide, antimicrobial material, bactericide, disinfectant, microbes and food for microbes, electron donors, and/or fungicides such as phenol, zinc undecylenate N.F., acetyl tyridinium chloride N.F.X.III, and the like.

Most preferred as the adsorbent, absorbent and/or reactant and/or neutralizing material are coke breeze, activated carbon, natural or synthetic zeolites, apatite, slag and/or an organophilic clay, which is basically a montmorillonite clay that has been reacted with a quaternary organic (onium ion-liberating, when solubilized) material to make it hydrophobic and adsorbent or sorbent to organic contaminants.

The above-described suspensions can be modified in a number of ways to suit various purposes and this adaptability is one of the primary benefits when compared with geosynthetic materials of the prior art. For example, the suspensions described herein can contain a heavy mineral, such as barite, iron oxide or the like, relatively uniformly, together with a powdered or granular contaminant-reactant so that the overall product has a specific gravity greater than 1.0, thereby enabling the material to submerge easily in water. Accordingly, the emulsions can be applied to the soil surface at the bottom of a filled lagoon, waste containment area, lake, river, ocean and the like, without first draining a lagoon or waste containment area. The product containing a heavy mineral can be pumped or sprayed over the water or waste containment upper level and allowed to sink to cover the soil surface at the bottom of the water or liquid waste material, thereby saving substantial time, effort and expense in sealing or treating a pre-existing lagoon, waste containment area, and the like, without first draining the lagoon or waste containment area.

In another embodiment, the suspensions described herein can have incorporated therein a very light material such as expanded vermiculite or expanded perlite, so that the product would have substantial buoyancy in water, but includes a weighting material such as sand, to increase the specific gravity of the suspension to a value above 1.0. To achieve the full advantage of one embodiment of the suspensions and methods described herein, the suspension should have a Brookfield viscosity in the range of about 100 to about 2,000 centipoises, preferably about 200 to about 1,000 cps., more preferably about 200 cps to about 700 cps.

The uses for the powdered or granular material-containing water-submergible suspensions described herein are virtually infinite since the suspensions can be applied against very contoured and slopping surfaces, rough or smooth, into crevices in the waterway floor, as well as below grades such as in tank farms, and for irrigation and water conservation techniques. The suspensions are substantially better than layered products having an intermediate layer of powdered or granular material since the suspensions will not peel apart and the contaminant-reactant material is positioned easily over large areas without the tendency to leak out of the product as occurs with geosynthetic products during handling and installation.

The suspensions described herein have a number of other advantages over the prior art layered geosynthetic products that include an upper and lower fabric surrounding an interior layer of powdered or granular materials since the suspensions are relatively viscous liquids containing suspended solids. The suspensions are particularly well suited for providing contaminant-removal in shored wall conditions to protect surface areas that are either sloped or horizontal. The suspensions are very durable, since strength is not dependent upon any method of structurally securing two separate fabric layers together across an intermediate layer of powdered or granular material.

Figure 5:
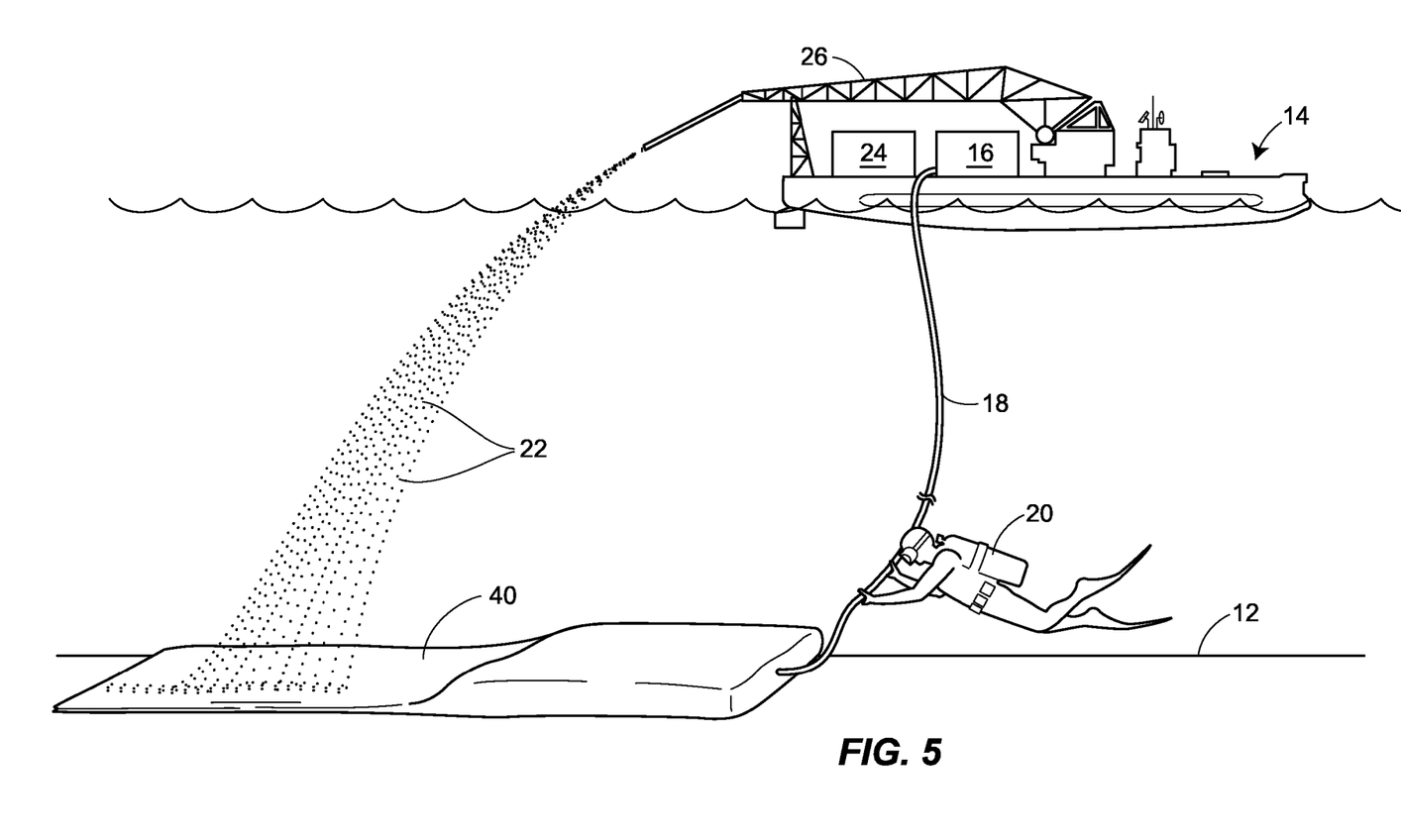
FIG. 5 is a perspective view of the suspension described herein being pumped into a large, water-permeable geosynthetic balloon-type enclosure through a diver-controlled hose.

In another embodiment, the suspensions described herein can be pumped in place under a geosynthetic fabric, or film, or large balloon-type geosynthetic material (FIG. 5) that is disposed on a waterway floor underwater. When disposed under a geosynthetic fabric or film, which may be water-permeable or water-impermeable, the geosynthetic fabric or film acts in maintaining the position of the suspension in contact with any contaminants thereunder. When the suspension is pumped into a water-permeable geosynthetic balloon, as shown in FIG. 5, the balloon maintains the position of the suspension.

A weighting agent may optionally be added to the suspension to adjust the density or weight of the fluid to a specific gravity greater than 1.0. Weighting agents useful in certain embodiments include, but are not limited to, sand, barite, bentonite, hematite, hausmannite, ilmenite, calcium carbonate, iron, iron carbonate, or a mixture thereof. The amount of weighting agent to add to obtain a suspension specific gravity greater than 1.0 is within the skill of a person of ordinary skill in the art with the benefit of this disclosure.

A biopolymer is a high molecular weight heteropolysaccharide obtained by the fermentation of a carbohydrate by the action of microorganisms. Numerous species of microorganisms are capable of producing hydrophilic gums. In general, all heteropolysaccharides having hydrophilic, pseudoplastic and viscosifying properties and which are products of fermentation may be used in the suspensions described herein. Exemplary of such microorganisms, the following are representative: bacteria of the genus *Xanthomonas, Arthrobacter* or *Azotobacter*. Experience has shown that certain species are capable of producing polymers with notable efficiency. The species *Xanthomonas begoniae, Xanthomonas campestris, Xanthomonas incanae* and *Xanthomonas pisi* are especially noted in this respect for the synthesis of heteropolysaccharides Suitable biopolymers include polysaccharides, such as xanthan gum, guar gum, scleroglucan, locust beangum, sodium alginate, sodium caseinate, and welan gum. However the polysaccharide may also be suitably produced by other micro-organisms like *Xanthomonas phaseoli, Xanthomonas carotae, Xanthomonas begomiae, Xanthomonas meanae, Xanthomonas malvacearum, Xanthomonas vesicatoria, Xanthomonas papavericola, Xanthomonas incanae, Xanthomonas translucens, Rhizobium meliloti, Alcaligenes faecalis* var. *myxogenes, Agrobacterium tumefaciens, Agrobacterium radiobacter*, and *Agrobacterium rhizogenes*.

The preferred polysaccharides useful in the suspensions described herein are polysaccharides which increase the low shear rate viscosity of the suspension to produce a suspension exhibiting a high yield stress, shear thinning behavior. Particularly useful are biopolymers produced by the action of bacteria, fungi, or other microorganisms on a suitable substrate. Exemplary biopolymers are the polysaccharides produced by the action of *Xanthomonas compestris* bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the suspensions described herein are the so-called welan gums produced by fermentation with a microorganism of the genus *Alcaligenes*. See for example U.S. Pat. No. 4,342,866, incorporated herein by reference. Gellan gums are disclosed in U.S. Pat. No. 4,503,084, incorporated herein by reference. Scleroglucan polysaccharides produced by fungi of the genus sclerotium are disclosed in U.S. Pat. No. 3,301,848, incorporated herein by reference, hereby incorporated by reference. Commercially available scleroglucan is sold under the trademarks "Polytran" from the Pillsbury Company and "Actigum CS-11" from CECA S.A. Succinoglycan polysaccharides are produced by cultivating a slime-forming species of *Pesudomonas, Rhizobium, Alcaligenes* or *Agrobacterium*, e.g., *Pseudomonas* sp. NCIB 11264, *Pseudomonas* sp. NCIB 11592 or *Agrobacterium radiobacter* NCIB 11883, or mutants thereof, as described in European Pat. No. 0 040 445 or 0 138 255, each incorporated herein by reference. Commercially available succinoglycan biopolymer is sold by Shell International Chemical Company of London, U.K., under the trademark "Shellflo-S".

Other useful polysaccharides include: cellulose derivatives, such as carboxymethyl cellulose, hydroxyethyl cellulose, mixed ethers, and the like; starches and starch derivatives such as carboxymethyl starch, hydroxyethyl starch, hydroxypropyl starch, mixed ethers, and the like, including the partially crosslinked derivatives thereof; guar gum and derivatives thereof; and other polysaccharides as are well known in the art.

The suspensions described herein maintain their stability for at least 24 hours, usually 3 to 10 days, when subjected to decomposition by underwater microorganisms. However, the suspensions can be broken earlier, if desired, by other means. For example, the biodegradable polymer(s) in the suspension can be biodegraded at will by contacting the emulsion with UV light and/or oxidizing agents, e.g., sodium hypochlorite or other bleaching solutions.

In the embodiment that includes a buoyant contaminant reactant, the suspension should not be broken before the suspension is essentially immobilized by covering the suspension with a weighting material, such as sand; or by covering the suspension with a geosynthetic film or geosynthetic fabric which contains a weighting material thereover, such as sand or rip-rap.

As shown in the drawings, the suspensions 10, described herein, can be deployed onto a waterway bottom or floor 12 from ship 14 by pumping the suspension 10 from suspension hopper 16 through hose 18 controlled by an underwater diver 20.

Figure 1:
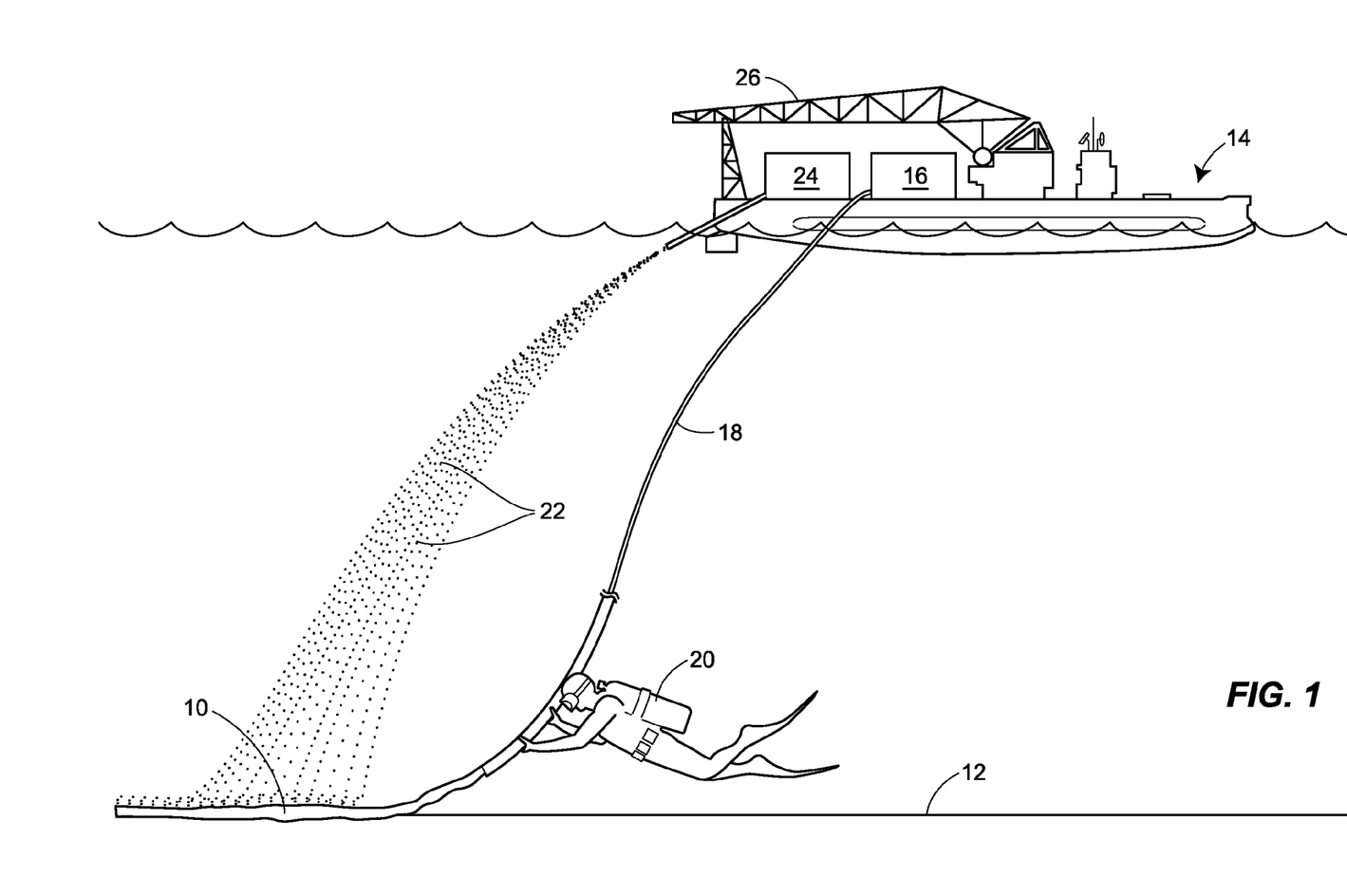
FIG. 1 is a perspective view of the suspensions described herein being deployed by a diver through a diver-controlled hose; the suspension then being overcoated with a weighting material from ship-level.
Figure 6:
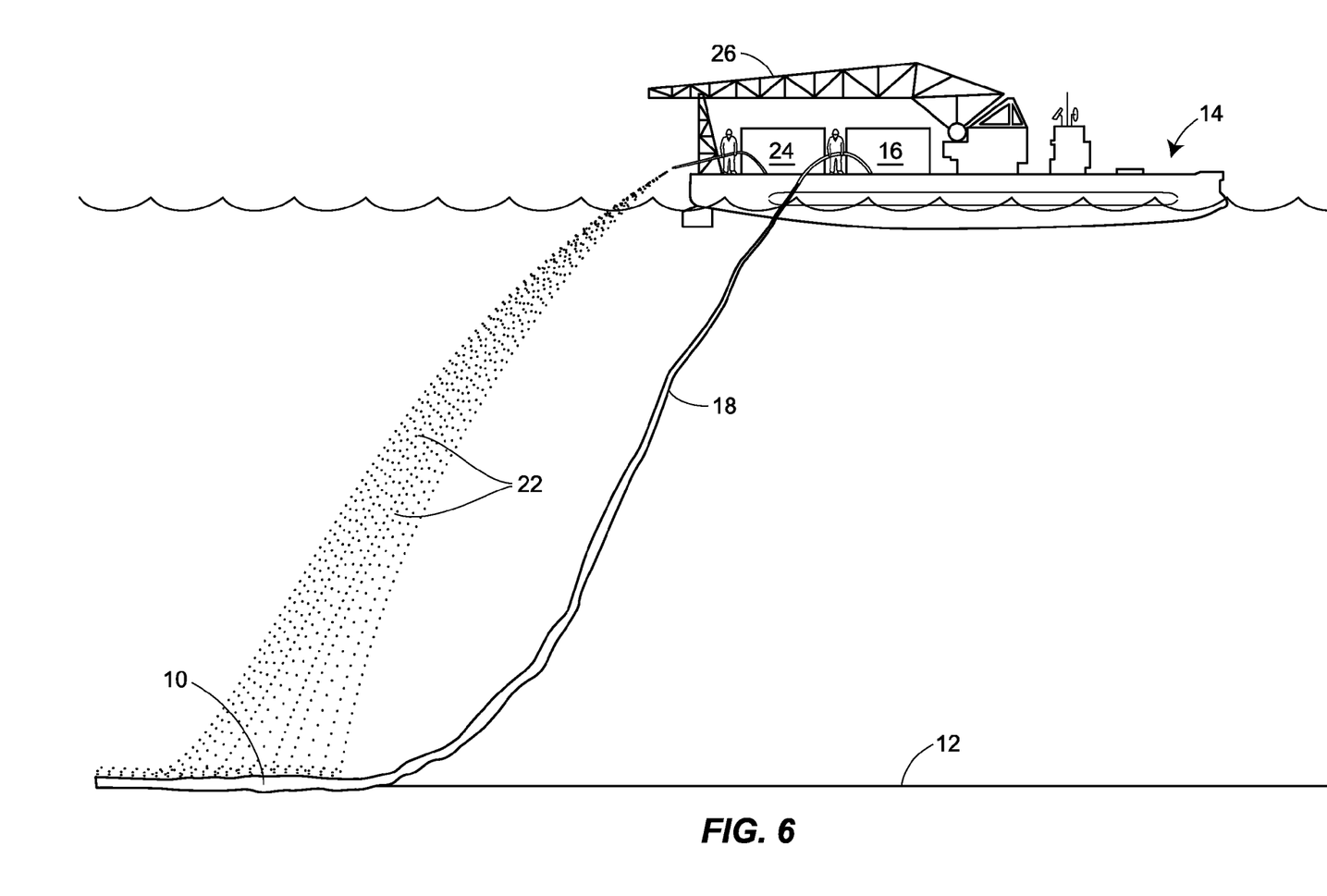
FIG. 6 is a perspective view of the suspensions described herein being pumped onto a surface of water, whereby the suspensions sink through the water depth to a waterway bottom or floor and are then overcoated with a weighting material, such as sand.

After placing the suspension over and/or into the contaminants contained in the waterway bottom or floor 12, the suspension may be overcoated with a cover material, such as sand 22 dropped over the suspension 10 from sand hopper 24 carried by the ship 14, as shown in FIGS. 1, 5 and 6. Alternatively, the placement of suspension 10 can be controlled from the ship without an underwater diver by control of a remotely operated vehicle (not shown) or ROV, well known in the art for underwater apparatus manipulation, e.g., see this assignee's U.S. Pat. No. 7,556,739, hereby incorporated by reference.

Figure 2:
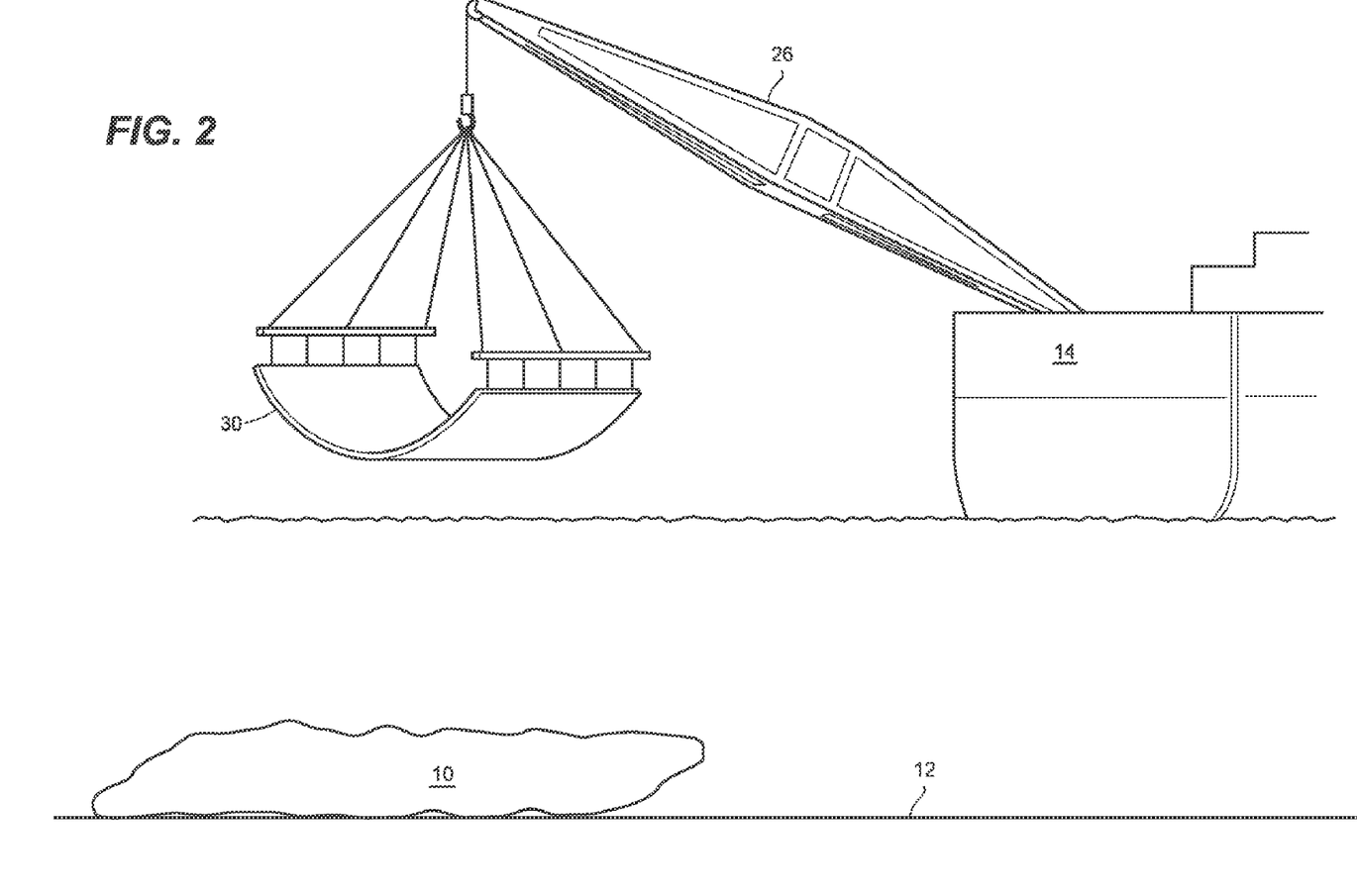
FIG. 2 is a perspective view showing a fabric or film being deployed over the suspensions described herein.

Alternatively, the suspension can be covered with a film or fabric 30, as shown in FIG. 2; or an interconnected gang of gabion cages 32; or film or fabric carrying gabion cages 32 (FIGS. 3 and 4), deployed from ship 14 via boom 26, as shown in this assignee's U.S. Pat. No. 7,670,082, hereby incorporated by reference.

Figure 3:
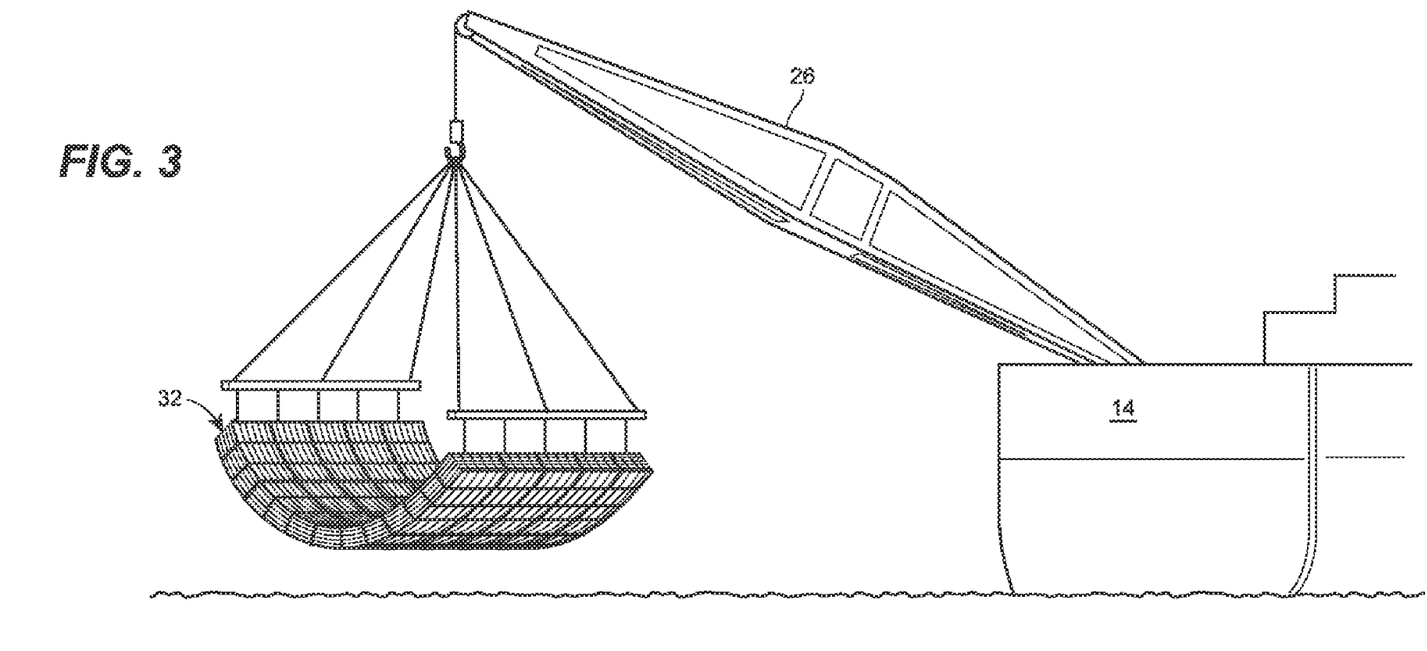
FIG. 3 is a perspective view showing a gang of gabion cages being deployed over the suspensions described herein.
Figure 4:
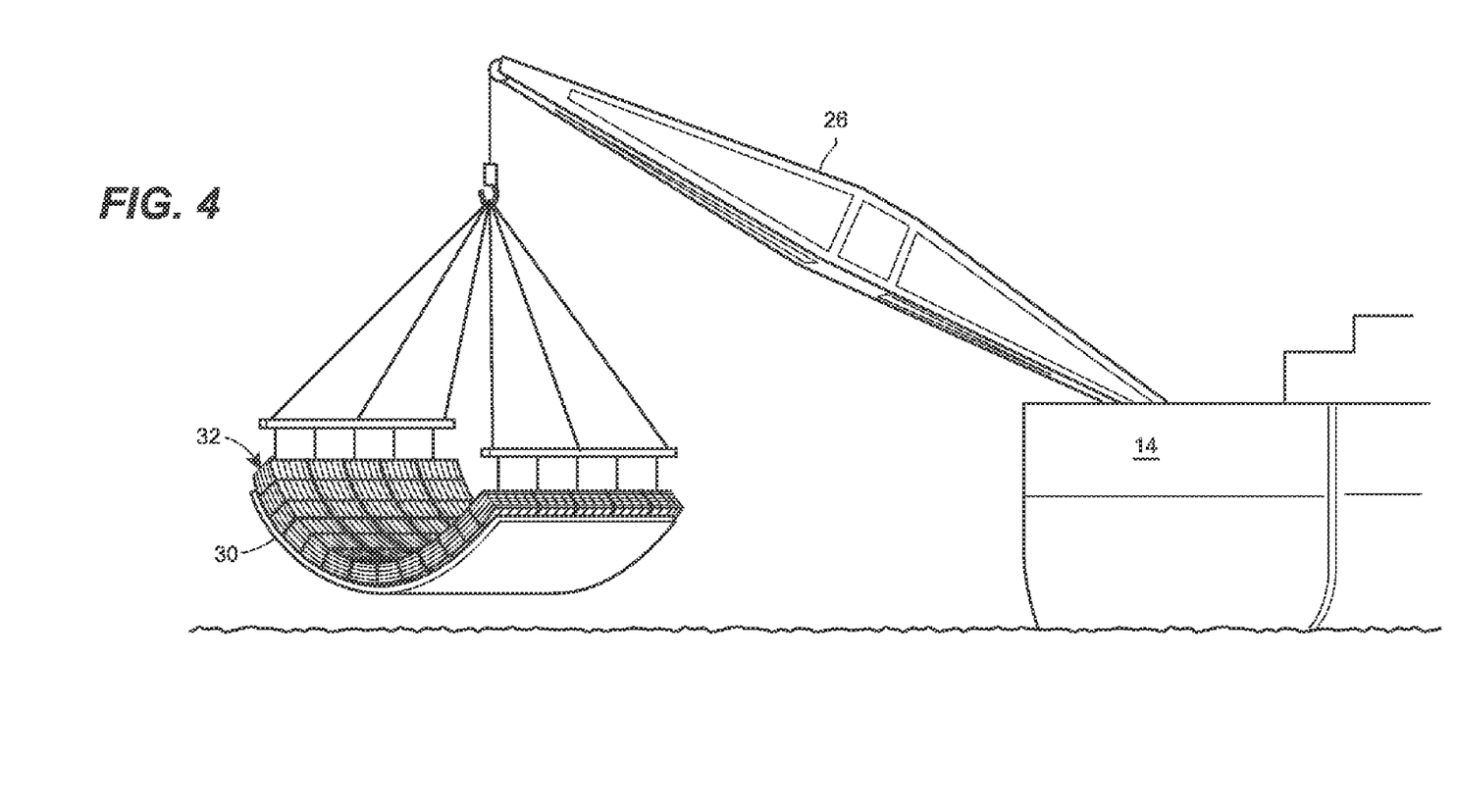
FIG. 4 is a perspective view showing a fabric and gang of gabion cages being deployed over the suspensions, wherein the gabion cages may contain additional contaminant reactive material, or may include only a weighting material, such as rip-rap.

As shown in FIGS. 2-4, one of a plurality (not shown) of overlapping films or fabrics 30 (FIG. 2); interconnected gabion cages 32 (FIG. 3) or films or fabrics 30; and gabion cages 32 (FIG. 4) can be disposed over the suspensions described herein by deployment from ship 14 and boom 26. In a preferred embodiment, divers 20 (FIG. 1), follow and direct the film or fabrics 30 (FIG. 2), gabion cages 32 (FIG. 3), or films or fabrics 30 and gabion cages 32 (FIG. 4) down through the water after the films on fabrics 30, and/or gabion cages 32, are released from boom 26 to dispose the film or fabrics 30 and or gabion cages 32 into precise overlapping position above the previously placed suspensions 10. Similarly, as shown in FIG. 5, overlapping water-permeable geosynthetic balloon-type enclosures 40 can be directed in place at the waterway bottom or floor 12 and then filled with the suspensions described herein.

The gabion cages 32 can include one or more contaminant reactive materials in multilayer geosynthetic fabrics disposed inside each cage, or may include geosynthetic sacks containing one or more contaminant reactive materials, as described in this assignee's U.S. Pat. No. 7,670,082. Alternatively, or additionally, the gabion cages may contain a weighting material, such as rip-rap.

Example 1

A suspension was prepared by mixing for 20 minutes in a Branbury high-shear mixer 14.4 grams of guar gum; 55 grams of activated carbon; and 45 grams of sand in 1 liter of water having a hardness of 445. The suspension had a Brookfield viscosity of 500 centipoises and there was no visible settling of solids after three days.

The invention claimed is:

1. A suspension for deployment on and/or in a contaminated soil or sediment in treating and/or confining a contaminant, said suspension having a specific gravity greater than 1.0, comprising:
   (a) about 0.5% to about 30% by weight of a contaminant-reactive material;
   (b) about 0.5% to about 30% by weight of biodegradable polymer; and
   (c) about 40% to about 99% by weight water.

2. The suspension of claim 1, wherein the contaminant-reactive material and the biodegradable polymer are each included in the suspension in an amount of about 0.5% to about 6% by weight.

3. The suspension of claim 2, wherein the contaminant-reactive material comprises activated carbon, coke breeze, or a mixture thereof.

4. The suspension of claim 2, wherein the biodegradable polymer comprises a mixture of a biodegradable starch and a biodegradable gum.

5. The suspension of claim 4, wherein the starch comprises a mixture of wheat starch and corn starch and the gum comprises a mixture of guar gum and xanthan gum.

6. The suspension of claim 1, wherein the biodegradable polymer comprises guar gum.

7. A method of deploying a contaminant-reactive material onto a waterway bottom or floor comprising pumping the aqueous suspension of claim 1 onto the waterway bottom or floor.

8. The method of claim 7 further including the step of pumping the suspension through a hose controlled by a diver or by above-water control of a remotely operated underwater vehicle.

9. The method of claim 8, wherein the suspension is pumped into a water-permeable geosynthetic enclosure that has a specific gravity greater than 1.0.

10. The method of claim 7, further including the step of covering the suspension with a covering material to maintain the position of the suspension on the waterway bottom or floor.

11. A method of deploying a contaminant-reactive material onto a waterway bottom or floor comprising spraying the suspension of claim 1 onto an upper surface of water and allowing the suspension to sink to the waterway bottom or floor, and covering the suspension with a covering material to maintain the position of the suspension on the waterway bottom or floor.

12. A suspension for sub-aqueous deployment in treating and/or confining a sub aqueous contaminant, said suspension having a specific gravity greater than 1.0, comprising:
   (a) about 0.5% to about 30% by weight of a contaminant-reactive material having a specific gravity less than 1.0;
   (b) about 0.5% to about 30% by weight of biodegradable polymer;
   (c) about 30% to about 98% by weight water; and (d) a sufficient amount of a weighting material such that the suspension has a specific gravity greater than 1.0.

13. The suspension of claim 12, wherein the contaminant-reactive material and the biodegradable polymer are each included in the suspension in an amount of about 0.5% to about 6% by weight.

14. The suspension of claim 13, wherein the biodegradable polymer comprises guar gum.

15. A method of deploying a contaminant-reactive material onto a waterway bottom or floor comprising pumping the aqueous suspension of claim 12 onto the waterway bottom or floor.

16. The method of claim 15 further including the step of pumping the suspension through a hose controlled by a diver or by above-water control of a remotely operated underwater vehicle.

17. The method of claim 15, further including the step of covering the suspension with a covering material to maintain the position of the suspension on the waterway bottom or floor.

* * * * *